(12) United States Patent
Geuß

(10) Patent No.: US 11,707,988 B2
(45) Date of Patent: Jul. 25, 2023

(54) METHOD FOR DISTRIBUTING A BRAKING TORQUE, REQUESTED BY A DRIVER, OVER THE AXLES OF A MOTOR VEHICLE

(71) Applicant: AUDI AG, Ingolstadt (DE)

(72) Inventor: Matthias Geuß, Breitengüßbach (DE)

(73) Assignee: AUDI AG, Ingolstadt (DE)

( * ) Notice: Subject to any disclaimer, the term of this patent is extended or adjusted under 35 U.S.C. 154(b) by 246 days.

(21) Appl. No.: 17/274,575

(22) PCT Filed: Sep. 25, 2019

(86) PCT No.: PCT/EP2019/075866
§ 371 (c)(1),
(2) Date: Mar. 9, 2021

(87) PCT Pub. No.: WO2020/074259
PCT Pub. Date: Apr. 16, 2020

(65) Prior Publication Data
US 2022/0048482 A1    Feb. 17, 2022

(30) Foreign Application Priority Data

Oct. 9, 2018   (DE) ...................... 10 2018 217 224.2

(51) Int. Cl.
*B60L 7/26*   (2006.01)
*B60W 30/18*  (2012.01)
(Continued)

(52) U.S. Cl.
CPC .................. *B60L 7/26* (2013.01); *B60L 7/18* (2013.01); *B60L 15/2009* (2013.01);
(Continued)

(58) Field of Classification Search
CPC .......... B60L 7/18; B60L 7/26; B60L 15/2009; B60L 15/2045; B60L 2220/42;
(Continued)

(56) References Cited

U.S. PATENT DOCUMENTS 6,406,105 B1 * 6/2002 Shimada ................... B60L 7/26
303/152
10,518,775 B1 * 12/2019 Velazquez Alcantar ....................
B60L 15/2045

(Continued)

FOREIGN PATENT DOCUMENTS

CN     104149764 A    11/2014
CN     105882631 A     8/2016
(Continued)

OTHER PUBLICATIONS

EPO machine translation of JP 2001-169405 A (original JP document published Jun. 22, 2001) (Year: 2001).*
(Continued)

*Primary Examiner* — David A Testardi
(74) *Attorney, Agent, or Firm* — Maier & Maier, PLLC

(57) ABSTRACT

A method for distributing a braking torque requested by a driver over the axles of a motor vehicle. The wheels of the first axle are associated with a first friction brake device and a first electrical machine having a first efficiency and the wheels of the second axle are associated with a second friction brake device and a second electrical machine having a second efficiency, in which, according to the method, the allocation of the requested braking torque over the first and/or second axle and the determination of the components of the recuperation torques to be provided by the first and/or second electrical machine of the requested braking torque is carried out taking into consideration the current driving stability of the motor vehicle.

13 Claims, 1 Drawing Sheet

(51) Int. Cl.
*B60L 7/18* (2006.01)
*B60L 15/20* (2006.01)
*B60T 8/1766* (2006.01)

(52) U.S. Cl.
CPC ........ *B60L 15/2045* (2013.01); *B60T 8/1766* (2013.01); *B60W 30/18127* (2013.01); *B60T 2270/603* (2013.01); *B60T 2270/604* (2013.01); *B60T 2270/608* (2013.01)

(58) Field of Classification Search
CPC .......... B60L 2260/28; B60W 30/18127; B60T 2270/604; B60T 2270/608; B60T 2270/613; B60T 1/10; B60T 8/1766
See application file for complete search history.

(56) References Cited

U.S. PATENT DOCUMENTS

| | | | | |
|---|---|---|---|---|
| 2002/0180266 A1* | 12/2002 | Hara | ............... | B60W 30/18109 903/918 |
| 2003/0062770 A1* | 4/2003 | Sasaki | ............... | B60T 13/662 303/152 |
| 2003/0132044 A1* | 7/2003 | Kitano | ............... | B60L 7/18 180/65.225 |
| 2003/0230933 A1* | 12/2003 | Schneider | ............... | B60K 6/52 303/146 |
| 2004/0070270 A1* | 4/2004 | Gunji | ............... | B60L 7/10 903/917 |
| 2004/0104699 A1* | 6/2004 | Nishikawa | ............... | B60K 6/44 180/65.225 |
| 2004/0238244 A1* | 12/2004 | Amanuma | ............... | B60L 7/26 903/917 |
| 2005/0099146 A1* | 5/2005 | Nishikawa | ............... | B60L 7/18 318/63 |
| 2007/0029874 A1* | 2/2007 | Finch | ............... | B60T 1/10 303/152 |
| 2009/0069149 A1* | 3/2009 | Okumura | ............... | B60W 30/18127 477/29 |
| 2010/0127562 A1* | 5/2010 | Yokoyama | ............... | B60T 1/10 303/151 |
| 2012/0203416 A1* | 8/2012 | Yoshimura | ............... | B60L 7/18 903/902 |
| 2013/0297165 A1* | 11/2013 | Crombez | ............... | B60T 1/10 701/70 |
| 2014/0257664 A1* | 9/2014 | Arbitmann | ............... | B60T 7/107 701/71 |
| 2014/0375115 A1* | 12/2014 | Ajiro | ............... | B60T 1/10 303/152 |
| 2016/0167527 A1* | 6/2016 | Jeon | ............... | B60L 7/26 701/70 |
| 2016/0236672 A1* | 8/2016 | Yanagida | ............... | B60W 10/06 |
| 2017/0113555 A1* | 4/2017 | Park | ............... | B60L 15/2009 |
| 2018/0086209 A1* | 3/2018 | Jeon | ............... | B60T 8/17 |
| 2018/0244159 A1* | 8/2018 | Satterthwaite | ............... | B60L 15/2009 |
| 2019/0092188 A1* | 3/2019 | Pianos | ............... | B60L 15/2009 |
| 2019/0275994 A1* | 9/2019 | Zhao | ............... | B60T 1/10 |
| 2020/0079220 A1* | 3/2020 | Geuß | ............... | B60T 8/17552 |
| 2020/0189398 A1* | 6/2020 | Suzuki | ............... | B60L 3/108 |
| 2020/0223316 A1* | 7/2020 | Erban | ............... | B60K 7/0007 |
| 2021/0114464 A1* | 4/2021 | Carbone | ............... | B60T 13/662 303/152 |

FOREIGN PATENT DOCUMENTS

| | | | | |
|---|---|---|---|---|
| CN | 108025651 A | 5/2018 | | |
| CN | 108045234 A | 5/2018 | | |
| DE | 112005001037 T5 | 5/2007 | | |
| DE | 102009030816 A1 | 11/2010 | | |
| DE | 102010054620 A1 | 3/2012 | | |
| DE | 102013209175 A1 | 11/2014 | | |
| DE | 102015106746 A1 | 11/2015 | | |
| DE | 102016003628 A1 | 9/2017 | | |
| EP | 537874 B1 * | 11/1995 | ........... | B60K 17/354 |
| JP | 2001112114 A * | 4/2001 | ........... | B60K 17/354 |
| JP | 2001169405 A * | 6/2001 | ............... | B60L 7/26 |
| WO | 2006/076999 A1 | 7/2006 | | |
| WO | WO-2009103914 A2 * | 8/2009 | ............... | B60K 6/48 |
| WO | 2012/041731 A1 | 4/2012 | | |
| WO | 2013/045584 A1 | 4/2013 | | |
| WO | 2017/042209 A1 | 3/2017 | | |

OTHER PUBLICATIONS

Office Action dated Nov. 11, 2022, in corresponding Chinese Application No. 201980066489.3, 17 pages.
German Examination Report dated Mar. 10, 2020 in corresponding German Application No. 10 2018 217 224.2; 24 pages; Machine translation attached.
International Search Report (with English translation) and Written Opinion (with Machine translation) dated Jan. 15, 2020 in corresponding International Application No. PCT/EP2019/075866; 20 pages.
Notification of Transmittal of Translation of the International Preliminary Report on Patentability dated Apr. 22, 2021, in connection with International Application No. PCT/EP2019/075866; 7 pages.

* cited by examiner

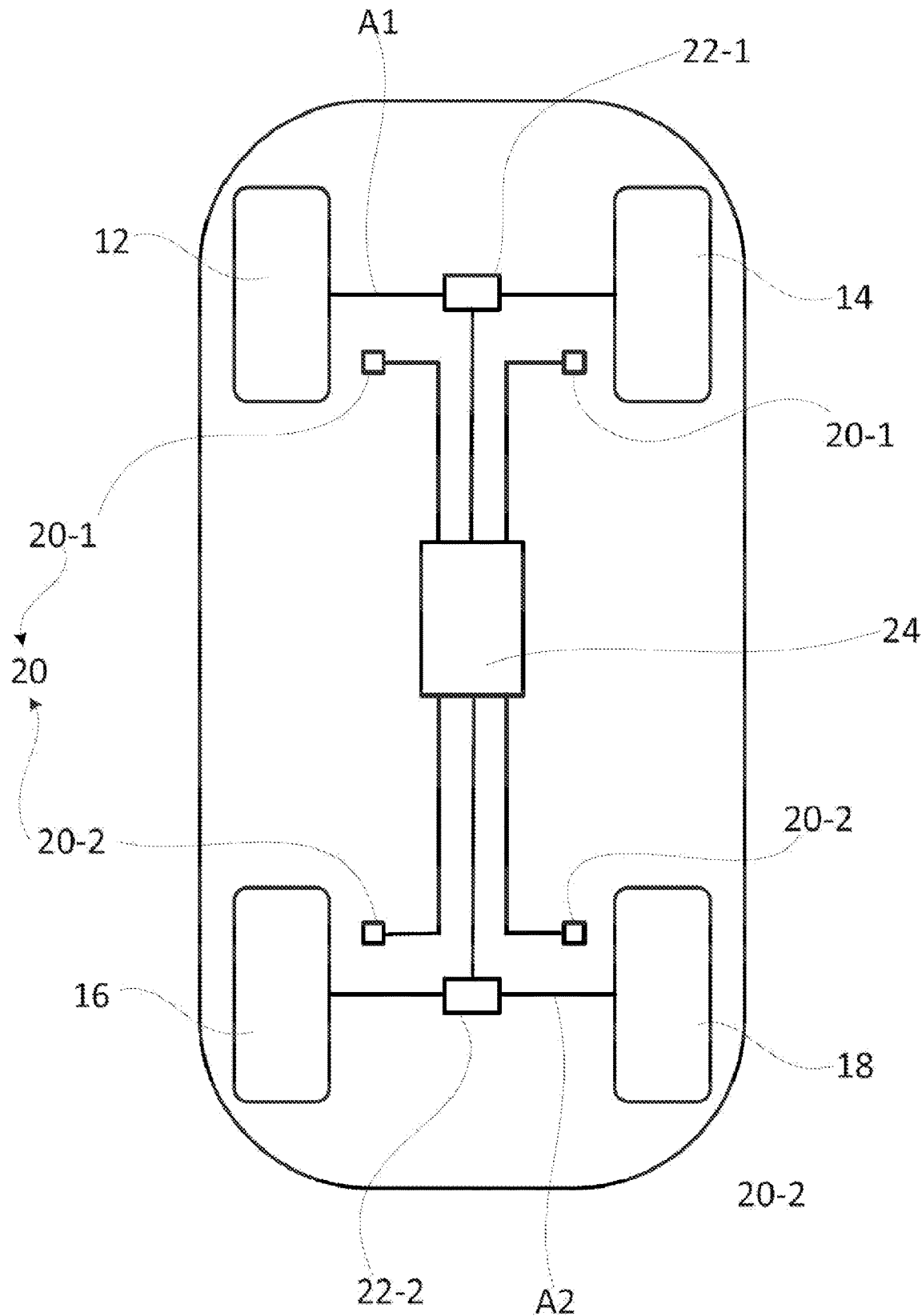

METHOD FOR DISTRIBUTING A BRAKING TORQUE, REQUESTED BY A DRIVER, OVER THE AXLES OF A MOTOR VEHICLE

FIELD

The invention relates to a method for distributing a braking torque requested by a driver over the axles of a motor vehicle, in particular an electric vehicle.

BACKGROUND

Braking systems capable of blending, which allocate a braking torque requested by the driver, e.g., via the brake pedal or accelerator pedal (one-paddle behavior), into a frictional braking torque component to be generated by a friction brake and a recuperation torque component to be provided by an electrical machine, as well as corresponding methods for distributing the requested braking torque over the axles of a motor vehicle are well known. As is known, the distribution of the frictional braking torque on the axles can be scalar, i.e., the distribution of the frictional braking torque on the front and rear axles is fixed hydraulically, such as 60%/40%, or axle-specific, i.e., the distribution on the front and rear axles can be changed variably in operation. Reference is made to DE 10 2015 106 746 A1 and DE 10 2016 003 628 A1 solely by way of example. DE 10 2016 003 628 A1 is distinguished in particular by the fact that at least one electrical machine is associated with each axle, so that a "mixed" braking torque, i.e., a frictional braking torque component and a recuperation torque component, is available for both axles.

SUMMARY

The invention is based on the object of specifying a method for distributing a braking torque requested by a driver over the axles of a motor vehicle, which method enables the greatest possible braking energy recovery and is therefore distinguished by high efficiency.

In a known manner, a friction brake device, hereinafter referred to as the first friction brake device, and an electrical machine are associated with the first axle. The electrical machine assigned to the first axle is also referred to hereinafter as the first electrical machine and its efficiency is referred to as the first efficiency. Correspondingly, a second friction brake device and a second electrical machine having a second efficiency are also associated with the second axle.

According to the invention, it is now provided that a braking torque requested by a driver is allocated over the first and/or second axle and the components of the recuperation torques to be provided by the first and/or second electrical machine in the requested braking torque are determined taking into consideration the current driving stability of the motor vehicle.

Since now, according to the method according to the invention, the allocation and the components of the recuperation torques to be provided by the first and/or second electrical machine are produced taking into consideration the current driving stability of the motor vehicle, that is, depending on the current driving stability, it is determined whether a recuperation torque is to be provided or how large a recuperation torque to be provided is to be, it is now advantageously ensured that braking energy can be recovered over a larger driving/stability range of the motor vehicle, with the consequence that high efficiency is ensured.

The current driving stability is preferably determined using sensors that are provided standard in current motor vehicles and a corresponding evaluation of the data provided by these sensors, such as acceleration, wheel speed, yaw, roll, pitch, lateral acceleration, and/or GPS data.

For the case of uncritical driving stability, the braking torque is allocated and the components of the recuperation torques to be provided by the first and/or second electrical machine are determined according to a first method sequence optimized in terms of efficiency of the electrical machines and/or comfort.

If, on the other hand, there is impending driving instability of the motor vehicle, the braking torque is allocated and the components of the recuperation torques to be provided by the first and/or second electrical machine are determined according to a second method sequence, preferably optimized in terms of driving dynamics. Imminent driving instability is to be understood in particular in such a way that the driver cannot yet feel it, that is to say, for example, there is a slight slip on the tires or there is a slight yaw rate deviation.

If the motor vehicle is in a critical driving situation, i.e., if there is driving instability, the braking torque is allocated and the components of the recuperation torques to be provided by the first and/or second electrical machine are determined according to a third method sequence, which is stable in terms of driving dynamics and is thus safer. The criterion of a critical driving situation or driving instability being present means that the driver can feel the resulting effect, i.e., that a large amount of slip occurs on the wheels or that there is a large yaw rate deviation.

Solely for the sake of completeness, it is also to be noted that the three ranges adjoin one another or can also overlap in transition ranges. The distribution can be changed quickly or slowly.

According to the first method sequence, it is provided that the requested driving torque is allocated over the first and second axle as a function of the efficiencies of the electrical machines. For this purpose, first the electrical machine having the better efficiency and then—if the maximum recuperation torque available from this electrical machine is not sufficient—the other electrical machine is utilized for providing the requested braking torque. This advantageously ensures maximum utilization of the generator torques. In addition to this efficiency-optimized distribution, a comfort-optimized distribution, for example to reduce vibrations, or a mixed distribution, i.e., optimized for efficiency/comfort, is also conceivable.

In this case—if the first recuperation torque available from the first electrical machine and/or the second recuperation torque available from the second electrical machine is sufficient to cover the requested braking torque—the requested braking torque is completely covered by the first and/or second electrical machine. In other words, no additional frictional torque is required.

For the case that an additional frictional torque is required, i.e., if the recuperation torque available from the first electrical machine and the recuperation torque available from the second electrical machine are not sufficient to cover the requested braking torque, a remaining residual frictional torque is determined, wherein the requested braking torque is then applied by the first and second electrical machine and the first and/or second friction brake device.

The remaining residual frictional torque is preferably allocated according to a scalar distribution, i.e., the distribution over the first and second axles is specified, or alternatively according to an axle-specific distribution, into a first frictional torque to be applied by means of the first friction brake device on the first axle and a second frictional torque to be applied by means of the second friction brake device on the second axle.

For the case of impending driving instability of the motor vehicle, the second method sequence provides that the requested braking torque is allocated by means of a stable distribution into a first braking torque to be applied on the first axle and a second braking torque to be applied on the second axle. Stable distribution is to be understood as a distribution that is stable in terms of driving dynamics, i.e., a distribution that is particularly front-axle-heavy, such as 70% front axle, 30% rear axle.

The stable distribution can be permanently stored or can also be designed as a stable distribution that is flexibly adjustable while driving.

It is provided according to the invention that the first braking torque necessarily includes a first recuperation torque component to be provided via the first electrical machine and the second braking torque necessarily includes a second recuperation torque component to be provided via the second electrical machine. This advantageously ensures that, based on the efficiency-optimized distribution and the determination that driving instability is imminent, the brake distribution is first changed from the efficiency-optimized distribution to a stable distribution, albeit less efficient. Since, according to the invention, it is imperative that the two electrical machines each provide a component of the braking torque, braking energy recovery is ensured.

In order to enable maximum braking energy recovery in this case as well—if the first recuperation torque available from the first electrical machine is sufficient to cover the first braking torque and the second recuperation torque available from the second electrical machine is sufficient to cover the second braking torque—the first braking torque is formed exclusively by the first recuperation torque component and the second braking torque is formed exclusively by the second recuperation torque component. The requested braking torque is thus applied completely, i.e., exclusively, by the first and second electrical machines.

For the case that the recuperation torque available from the first electrical machine is not sufficient to cover the first braking torque and/or the recuperation torque available from the second electrical machine is not sufficient to cover the second braking torque, the first braking torque comprises an additional first frictional torque component and/or the second braking torque comprises an additional second frictional torque component, so that the requested braking torque is applied by the first and second electrical machine and the first and/or second friction brake device.

If additional frictional torques are now required to provide the requested braking torque, these are allocated according to one embodiment of the method according to the invention according to a scalar distribution, i.e., the distribution over the first and second axles is predetermined. For this purpose, a first frictional torque component to be applied by means of the first friction brake device on the first axle and a second frictional torque component to be applied by means of the second friction brake device on the second axle are determined from the residual frictional torque according to the stable distribution. Then, taking into consideration the first and second frictional torque components and the stable distribution, a first and second recuperation torque component is determined. The requested braking torque is thus applied by the first and second electrical machine and the first and second friction brake device.

An alternative embodiment provides an axle-specific distribution of the additional frictional torques required for providing the requested braking torque. This means that the residual frictional torque is allocated according to an axle-specific distribution into a first frictional torque component to be applied by means of the first friction brake device on the first axle and/or a second frictional torque component to be applied by means of the second friction brake device on the second axle. The requested braking torque is thus applied by the first and second electrical machine and the first and/or second friction brake device.

If the motor vehicle is in a critical driving situation, i.e., a driving instability has already occurred, according to the third method sequence, the requested braking torque is allocated by means of a stable distribution into a first braking torque to be applied on the first axle and a second braking torque to be applied on the second axle, wherein the first braking torque necessarily includes a first frictional torque component to be applied via the first friction brake device and/or the second braking torque necessarily includes a second frictional torque component to be applied via the second friction brake device.

This advantageously ensures that a friction brake torque is present on at least one axle, so that it is ensured the ABS system can work and engage on at least one axle.

Solely for the sake of completeness, it is noted once again that, according to the third method sequence, the stable distribution can also be permanently stored or, alternatively, can also be designed as a stable distribution that is flexibly adjustable while driving.

According to a first embodiment, the first braking torque is provided entirely via the first friction brake device and the second braking torque is provided entirely via the second friction brake device. In other words, a recuperative braking torque component is not provided. Since the recuperative braking torque component is reduced to zero and thus the total braking torque is generated exclusively by the two friction brake devices, more working latitude is advantageously available for the ABS system.

Another embodiment provides that the first frictional torque component is specified for the first braking torque, and that the second frictional torque component is determined from the specified first frictional torque component according to the stable distribution or that the second frictional torque component is specified for the second braking torque, and that the first frictional torque component is determined from the specified second frictional torque component according to the stable distribution. In other words, there is a scalar distribution of the braking torque. Then, taking into consideration the first and/or second frictional torque component according to the stable distribution, a first and/or second recuperation torque component is determined so that the requested braking torque is applied by the first and second friction brake device and the first and/or second electrical machine.

An alternative embodiment provides an axle-specific distribution. That is, the first frictional torque component of the first braking torque and/or the second frictional torque component of the second braking torque is specified again, wherein a first and/or second recuperation torque component is now determined taking into consideration the specified first and/or second frictional torque component according to the stable distribution, wherein the requested braking torque is applied by the first and/or second friction brake device and the first and/or second electrical machine.

BRIEF DESCRIPTION OF THE FIGURE(S)

Further advantages and possible uses of the present invention will be apparent from the following description in conjunction with the exemplary embodiment depicted in the drawing.

In the FIGURE:

The FIGURE shows a schematic illustration of a motor vehicle to illustrate the method of distributing a braking torque requested by a driver over the axles of a motor vehicle.

DETAILED DESCRIPTION

The FIGURE shows a schematic representation of a motor vehicle designated as a whole by reference sign 10. The front axle, hereinafter also referred to as the first axle, is denoted by the reference sign A1 and the rear axle, also referred to as the second axle below, is denoted by the reference sign A2.

The wheels 12, 14 of the first axle A1 are each associated with a first friction brake device 20-1 and a first electrical machine 22-1, which are only indicated schematically here. Correspondingly, the wheels 16, 18 of the second axle A2 are each associated with a second friction brake device 20-2 and a second electrical machine 22-2. The electrical machines 22-1, 22-2 can be operated as generators in a known manner during recuperation. The first and second friction brake device 20-1, 20-2 form the friction brake system of the motor vehicle 10, denoted by the reference sign 20.

The friction brake system 20 and the electrical machines 22-1, 22-2 can be controlled via a regulating control unit 24, so that a braking torque FBM requested by a driver can be allocated over the first and second axles A1, A2.

In the present case, the two electrical machines 22-1, 22-2 have different efficiencies n1, n2, namely the electrical machine 22-1 associated with the front axle A1 an efficiency n1=80% and the electrical machine 22-2 associated with the rear axle A2 an efficiency n2=90%. That is, the second electrical machine 22-2 has a better efficiency than the first electrical machine 20-1.

For the following description, it is also assumed that the first electrical machine 22-1 has a maximum recuperation torque RK1_Max=300 Nm and the second electrical machine 22-2 has a maximum recuperation torque RK2_Max=700 Nm.

Scenario 1:

A completely uncritical driving situation is assumed for scenario 1, i.e., the case of uncritical driving stability is present.

1. For the first consideration it is assumed that the requested braking torque FBM=500 Nm.

According to the method, the allocation of the requested braking torque in the amount of FBM=500 Nm is now carried out as a function of the efficiencies n1, n2 of the two electrical machines 22-1, 22-2.

In the present case, the second electrical machine 22-2 has a better efficiency and the maximum recuperation torque RK2_Max of the second electrical machine 22-2 is sufficient to cover the requested braking torque.

Therefore, the braking takes place exclusively via the electrical machine 22-2 associated with the rear axle A2 (=>single-axle operation) and for the distribution of the requested braking torque FBM over the axles A1, A2: 0% front axle; 100% rear axle.

2. For the following second consideration, it is assumed that the requested braking torque FBM=800 Nm.

Since the second electrical machine 22-2 has a better efficiency, the second electrical machine 22-2 is first fully utilized for providing the requested braking torque FBM and the remaining residual torque is provided by the first electrical machine 22-1.

In the present case, this means that of the requested braking torque FBM=800 Nm, a component of RK1=700 Nm is provided by the second electrical machine 22-2 and a component of RK2=100 Nm is provided by the first electrical machine 22-1.

This means that there is a two-axle operation, wherein the following applies for the distribution of the requested braking torque FBM over the axles A1, A2: front axle 12.5%; rear axle 87.5%.

3. In the following third consideration, a requested braking torque of FBM=1350 Nm is assumed.

Since the sum of the maximum recuperation torques RK1=300 Nm, RK2=700 Nm available from the electrical machines 22-1, 22-2 is not sufficient to provide the requested braking torque of FBM=1350 Nm, a remaining residual frictional torque Reib_Rest is required.

To provide the requested braking torque FBM=1350 Nm, according to the method, the two electrical machines 22-1, 22-2 are first fully utilized, i.e., with regard to the recuperation torques, there is a distribution of front axle 30% and rear axle 70%.

The remaining residual frictional torque, Reib_Rest, is in the present case Reib_Rest=1350 Nm−1000 Nm=350 Nm.

The distribution of the remaining residual frictional torque, Reib_Rest, over the axles A1 and A2 is freely selectable.

In the present case, however, the remaining residual frictional torque is distributed according to a stored distribution=60%/40%, for example.

In the present case, this means that a first frictional torque Reib-1=0.6*350 Nm=210 Nm is to be provided on the front axle A1 and a second frictional torque Reib-2=0.4*350 Nm=140 Nm is to be provided on the rear axle A2.

The requested braking torque of FBM=1350 Nm is accordingly allocated over the first and second axles A1, A2 as follows:

first axle or front axle A1:
component of recuperation torque RK1=300 Nm
component of first frictional torque Reib-1=210 Nm
second axle or rear axle A2:
component of recuperation torque RK2=700 Nm
component of second frictional torque, Reib-2=140 Nm The following thus results for the distribution of the requested braking torque FBM on the axles A1, A2:
front axle 37.8%; rear axle 62.2%.

Scenario 2:

For scenario 2, it is assumed that there is impending driving instability.

B1/B2=60/40 is stored as the value for the stable distribution, i.e., 60% on the front axle and 40% on the rear axle.

1. For the first consideration it is assumed that the requested braking torque FBM=500 Nm.

According to the method, in case of impending driving instability, the requested braking torque FBM=500 Nm is to be allocated over the axles A1 and A2 according to the stored stable distribution 60/40. This means that a first braking torque BM1=0.6*500 Nm=300 Nm is to be provided at the front axle A1 and a second braking torque BM2=0.4*500 Nm=200 Nm is to be provided at the rear axle A2.

Since the first recuperation torque RK1=300 Nm available from the first electrical machine 22-1 is sufficient to cover the first braking torque BM1=300 Nm and the second recuperation torque RK2=700 Nm available from the second electrical machine 22-2 is sufficient to cover braking torque BM2=200 Nm, the requested braking torque FBM is applied completely by the first and second electrical machine 22-1, 22-2.

2. For the second consideration, it is assumed that the requested braking torque FBM=800 Nm.

On the basis of the stored stable distribution B1/B2=60/40, there is a first braking torque BM1 to be provided at the front axle A1 in the amount of BM1=0.6*800 Nm=480 Nm and there is a second braking torque BM2 to be provided at the rear axle A2 in the amount of BM2=0.4*800 Nm=320 Nm While the recuperation torque of RK1=300 Nm available from the first electrical machine 22-1 on the front axle A1 is not sufficient in the present case to provide the required braking torque BM1=480 Nm, the recuperation torque RK2=700 Nm available from the second electrical machine 22-2 on the rear axle A2 is sufficiently large.

This results in the remaining residual frictional torque Reib_Rest in the amount of Reib-Rest=180 Nm.

In the present case, a first frictional torque component BM1-Reib to be applied by means of the first friction brake device 20-1 on the first axle A1 and a second frictional torque component BM2-Reib to be applied by means of the second friction brake device 20-2 on the second axle A2 are determined from the remaining residual frictional torque Reib_Rest according to an axle-specific distribution.

Since, as already stated, in the present case the recuperation torque that can be provided by the second electrical machine 22-2 on the rear axle A2 is sufficient, that is, an additional frictional torque component is not required on the rear axle A2, that is, BM2-Reib=0, the remaining frictional torque Reib_Rest corresponds to the first frictional torque component to be provided on the first axle BM1-Reib=180 Nm.

Thus, the first braking torque BM1 to be provided on the front axle A1 in the amount of BM1=480 Nm has a first recuperation torque component BM1-Rek in the amount of BM1-Rek=300 Nm and a first frictional torque component BM1-Reib in the amount of BM1-Reib=180 Nm.

Since an additional frictional torque component is not required on the rear axle A2, i.e., BM2-Reib=0, here BM2=BM2-Rek=320 Nm.

An alternative embodiment provides a scalar distribution of the frictional braking torque:

For this purpose, a first frictional torque component BM1-Reib to be applied by means of the first friction brake device 20-1 on the first axle A1 and a second frictional torque component BM2-Reib to be applied by means of the second friction brake device 20-2 on the second axle A2 are determined from the residual frictional torque Reib-Rest=180 Nm according to the stable distribution B1/B2=60%/40%.

BM1-Reib=Reib-Rest=180 Nm, or

BM2-Reib=BM1-Reib*$B2/B1$=180*⅔=120 Nm

The braking torque BM1 to be provided on the front axle A1 in the amount of BM1=480 Nm is thus composed of a first frictional torque component BM1-Reib in the amount of BM1-Reib=180 Nm and a first recuperation torque component BM1-Rek in the amount of BM1-Rek=300 Nm.

The braking torque BM2 to be provided on the rear axle A2 in the amount of BM2=320 Nm includes a second frictional torque component BM2-Reib in the amount of BM2-Reib=120 Nm and a second recuperation torque component BM2-Rek in the amount of BM2-Rek=200 Nm.

Scenario 3:

For scenario 3, it is assumed that the motor vehicle is in a critical driving situation, i.e., driving instability already exists.

The stored value for the stable distribution is again B1/B2=60/40 and a braking torque of FBM 1000 Nm is requested by the driver.

Thus, a first braking torque BM1 in the amount of BM1=600 Nm is to be provided on the front axle A1 and a second braking torque BM2 in the amount of BM2=400 Nm is to be provided on the rear axle A2.

According to a first consideration, it is provided that the braking torques BM1, BM2 to be provided on the axles A1 and A2 are to be applied entirely via the first and second friction brake device 20-1, 20-2. This means that the recuperation torques are reduced to zero.

In the present case, this means that on the front axle A1 a first braking torque BM1 in the amount of BM1=0.6*1000 Nm=600 Nm is provided by the first friction brake device 20-1 and on the rear axle A2 a second braking torque BM2 in the amount of BM2=0.4*1000 Nm=400 Nm is provided by the second friction brake device 20-2.

For the following consideration, it is provided that the braking torques BM1, BM2 to be provided on the two axles A1, A2 are respectively to also include a recuperation torque component BM1-Rek, BM2-Rek.

It is assumed that the first frictional torque component BM1-Reib to be set by the first friction brake device 20-1 is specified, in the present case BM1-Reib=300 Nm.

With the help of the stable distribution B1/B2=60/40, the second frictional torque component BM2-Reib to be applied to the second axle A2 by means of the second friction brake device 20-2 is determined:

BM2-Reib=BM1-Reib*$B2/B1$=300*⅔=200 Nm

The braking torque BM1 to be provided on the front axle A1 in the amount of BM1=600 Nm is thus composed of the specified first frictional torque component BM1-Reib in the amount of BM1-Reib=300 Nm and a first recuperation torque component BM1-Rek in the amount of BM1-Rek=300 Nm.

The braking torque BM2 to be provided on the rear axle A2 in the amount of BM2=400 Nm includes a second frictional torque component BM2-Reib in the amount of BM2-Reib=200 Nm and a second recuperation torque component BM2-Rek in the amount of BM2-Rek=200 Nm.

The braking torque BM1 to be provided on the first axle A1 is thus applied by the first friction brake device 20-1 and the first electrical machine 22-1. Correspondingly, the braking torque BM2 to be provided on the second axle A2 is also applied by the second friction brake device 20-2 and the second electrical machine 22-2.

Axle-specific distribution is also conceivable. A first braking torque BM1 is then to be provided on the front axle A1, which includes the frictional torque component BM1-Reib in the amount of 300 Nm specified here and a recuperation torque component in the amount of BM1-Rek=300 Nm. The second braking torque BM2 to be provided on the second axle A2, on the other hand, only includes a recuperative component of BM2-Rek=400 Nm, since the recuperation torque RK2_Max available from the second electrical machine 22-2 is sufficient to provide the required second braking torque BM2 in the amount of BM2=400 Nm.

That is, the braking torque BM1 to be provided on the first axle A1 is applied by the first friction brake device 20-1 and the first electrical machine 22-1, while the braking torque BM2 to be provided on the second axle A2 is exclusively provided in the present case by the second electrical machine 22-2.

The invention claimed is:

1. A method for distributing a braking torque requested by a driver over axles of a motor vehicle, the motor vehicle comprising:
    front wheels arranged on a front axle and assigned a first friction brake device and a first electric machine having a first efficiency and a first maximum recuperation torque; and
    rear wheels arranged on a rear axle and assigned a second friction brake device and a second electric machine having a second efficiency and a second maximum recuperation torque,
    wherein the second efficiency is greater than the first efficiency and the second maximum recuperation torque is greater than the first maximum recuperation torque,
    the method comprising:
    determining conditions of driving stability using sensors of the motor vehicle; and
    allocating the braking torque requested by the driver between the front and rear axles such that:
    during an uncritical driving stability condition of the motor vehicle in which driving stability exists, the braking torque is allocated first between the first and second electric machines as a function of the first and second efficiencies to maximize recuperated energy;
    during an impending driving instability condition of the motor vehicle, the braking torque is allocated first between the front and rear axles according to a stable distribution ratio, and the first and second electric machines both provide a recuperation torque; and
    during a critical driving instability condition of the motor vehicle where driving instability of the vehicle already exists, the braking torque is allocated first between the front and rear axles according to the stable distribution ratio, and the first and second friction brake devices provide a friction torque.

2. The method according to claim 1, wherein, during the critical driving instability condition of the motor vehicle, the braking torque is provided entirely by the first and second friction brake devices.

3. The method according to claim 1, wherein, during the critical driving instability condition of the motor vehicle, the braking torque is provided by the first and second friction brake devices and at least one of the first and second electric machines.

4. The method according to claim 1, wherein, during either the uncritical driving stability condition or the impending driving instability condition, any residual braking torque, which is any of the braking torque requested by the driver that is not provided by the first and the second electric machines, is provided by at least one of the first and second friction brake devices.

5. The method according to claim 4, wherein the residual braking torque is allocated between the first and second friction brake devices according to a predetermined scalar distribution.

6. The method according to claim 4, wherein the residual braking torque is allocated between the first and second friction brake devices according to an axle-specific distribution.

7. The method according to claim 1, wherein the uncritical driving stability condition, the impending driving instability condition, and the critical driving instability condition adjoin one another.

8. The method according to claim 1, wherein the uncritical driving stability condition, the impending driving instability condition, and the critical driving instability condition overlap in transitional regions.

9. The method according to claim 1, wherein, during the uncritical driving stability condition, the braking torque is allocated between the first and second electric machines further to minimize vibrations.

10. The method according to claim 1, wherein allocation of the braking torque according to the stable distribution ratio comprises distributing 70% of the braking torque to the front axle and 30% of the braking torque to the rear axle.

11. The method according to claim 1, wherein allocation of the braking torque according to the stable distribution ratio comprises distributing the braking torque between the front and rear axles in a ratio which is flexibly adjustable while driving.

12. The method according to claim 1, wherein a driving stability of the motor vehicle is determined based on at least one of:
    a detected lateral acceleration,
    a detected slip of at least one wheel,
    a detected yaw rate and/or yaw rate difference,
    a detected vehicle speed,
    a detected difference in wheel speeds between wheels of the motor vehicle, and
    a frictional connection utilization of at least one wheel.

13. A motor vehicle system comprising a control unit configured for carrying out a method for distributing a braking torque requested by a driver over axles of a motor vehicle, the motor vehicle comprising:
    front wheels arranged on a front axle and assigned a first friction brake device and a first electric machine having a first efficiency and a first maximum recuperation torque; and
    rear wheels arranged on a rear axle and assigned a second friction brake device and a second electric machine having a second efficiency and a second maximum recuperation torque,
    wherein the second efficiency is greater than the first efficiency and the second maximum recuperation torque is greater than the first maximum recuperation torque, and
    the method comprising:
    determining conditions of driving stability using sensors of the motor vehicle; and
    allocating the braking torque requested by the driver between the front and rear axles such that:
    during an uncritical driving stability condition of the motor vehicle in which driving stability exists, the braking torque is allocated first between the first and second electric machines as a function of the first and second efficiencies to maximize recuperated energy;
    during an impending driving instability condition of the motor vehicle, the braking torque is allocated first between the front and rear axles according to a stable distribution ratio, and the first and second electric machines both provide a recuperation torque; and during a critical driving instability condition of the motor vehicle where driving instability of the vehicle already exists, the braking torque is allocated first between the front and rear axles according to the stable distribution ratio, and the first and second friction brake devices provide a friction torque.

\* \* \* \* \*